United States Patent
Grafham et al.

(10) Patent No.: US 10,387,212 B2
(45) Date of Patent: Aug. 20, 2019

(54) ATTRIBUTE COLLECTION AND TENANT SELECTION FOR ON-BOARDING TO A WORKLOAD

(71) Applicant: Microsoft Technology Licensing, LLC, Redmond, WA (US)

(72) Inventors: Michael D. Grafham, Bellevue, WA (US); Kent D. Mitchell, Denver, CO (US); Pei Li, Sammamish, WA (US); Venkata Ratnam Saripalli, Folsom, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 145 days.

(21) Appl. No.: 15/624,251

(22) Filed: Jun. 15, 2017

(65) Prior Publication Data
US 2018/0365077 A1 Dec. 20, 2018

(51) Int. Cl.
*G06F 9/455* (2018.01)
*G06F 9/50* (2006.01)
*G06N 7/00* (2006.01)
*G06Q 10/06* (2012.01)

(52) U.S. Cl.
CPC .......... *G06F 9/5083* (2013.01); *G06N 7/005* (2013.01); *G06Q 10/067* (2013.01); *G06Q 10/0631* (2013.01); *G06Q 10/06313* (2013.01)

(58) Field of Classification Search
CPC .......... G06F 9/5072; G06F 2009/4557; G06F 9/45558; G06F 9/50; G06F 9/5066; G06F 9/5077; G06F 9/5083
See application file for complete search history.

(56) References Cited

U.S. PATENT DOCUMENTS

| 9,246,840 B2 | 1/2016 | Anderson et al. |
| 9,274,848 B2 | 3/2016 | Dawson et al. |
| 9,654,639 B1 | 5/2017 | Balarajan et al. |
| 2008/0239985 A1* | 10/2008 | Karve ............. H04L 41/0856 370/254 |
| 2009/0276771 A1* | 11/2009 | Nickolov ............. G06F 9/4856 717/177 |
| 2012/0284408 A1* | 11/2012 | Dutta ................. G06F 9/5066 709/226 |
| 2013/0332587 A1* | 12/2013 | Maya .................. G06Q 10/10 709/223 |
| 2014/0075034 A1 | 3/2014 | Vasudevan et al. |

(Continued)

OTHER PUBLICATIONS

Ju, et al., "Tenant Onboarding in Evolving Multi-tenant Software-as-a-Service Systems", In Proceedings of IEEE 19th International Conference on Web Services, Jun. 24, 2012, 8 pages.

(Continued)

*Primary Examiner* — Dong U Kim
(74) *Attorney, Agent, or Firm* — Christopher J. Volkmann; Kelly, Holt & Christenson, PLLC

(57) ABSTRACT

A tenant model models workload usage of tenants, based upon a set of tenant attributes. The model is applied to a set of tenants waiting to be on-boarded to a workload to identify a metric indicative of likely tenant usage of the workload. A subset, of the set of tenants, are identified for on-boarding, based upon the metric, and on-boarding functionality is controlled to the identified subset of tenants.

20 Claims, 13 Drawing Sheets

(56) References Cited

U.S. PATENT DOCUMENTS

| | | | |
|---|---|---|---|
| 2014/0082131 A1* | 3/2014 | Jagtap | G06F 9/5072 |
| | | | 709/217 |
| 2014/0200947 A1 | 7/2014 | Gujar et al. | |
| 2015/0058484 A1 | 2/2015 | Mehta et al. | |
| 2015/0089068 A1* | 3/2015 | Islam | H04L 47/741 |
| | | | 709/226 |
| 2015/0120818 A1* | 4/2015 | Kim | G06F 9/45558 |
| | | | 709/203 |
| 2015/0178135 A1* | 6/2015 | Wang | G06F 9/5027 |
| | | | 718/104 |
| 2016/0004551 A1* | 1/2016 | Terayama | G06F 9/5011 |
| | | | 718/1 |
| 2016/0094413 A1* | 3/2016 | Jain | H04L 41/5019 |
| | | | 709/226 |
| 2016/0094484 A1 | 3/2016 | Mordani et al. | |
| 2016/0182324 A1* | 6/2016 | Harishankar | H04L 43/062 |
| | | | 709/224 |

OTHER PUBLICATIONS

"CA Cloud Service Delivery", https://support.ca.com/cadocs/0/CA%20Cloud%20Service%20Delivery%20Platform%201%200-ENU/Bookshelf_Files/PDF/Customer%20Onboarding.pdf, Retrieved on: Mar. 29, 2017, pp. 1-14.

"Onboarding and Migration Phases", https://technet.microsoft.com/en-us/library/mt651707.aspx, Published on: Mar. 7, 2017, 14 pages.

"International Search Report and Written Opinion Issued in PCT Application No. PCT/US2018/032854", dated Sep. 21, 2018, 12 Pages.

\* cited by examiner

ATTRIBUTE COLLECTION AND TENANT SELECTION FOR ON-BOARDING TO A WORKLOAD

BACKGROUND

Computing systems are currently in wide use. Some computing systems host services for tenants. Some hosted services can include applications (or workloads) such as electronic mail (e-mail) workloads, document management and sharing workloads, word processing, calendaring, and presentation applications or workloads, among a wide variety of others.

A computing system that hosts a workload or service (and sometimes a tenant computing system) usually need to be configured in order to allow a new tenant to access a workload, or in order to allow an existing tenant to access a new workload. The process of working with a tenant to access a workload is referred to as "on-boarding". Depending upon the size of the tenant (in terms of the number of seats purchased by the tenant, for the workload), and depending upon the workload itself, the on-boarding process may be a relatively high latency process (in that it may take days or longer to on-board the tenant). This can be a relatively time consuming and cumbersome process during which engineers or other tenant on-boarding users assist the tenants in configuring their computing system and in configuring the workload computing system, so that the tenant has desired access to the workload. Similarly, the on-boarding process uses computing system processing and memory resources, as well as personal resources, and can be quite costly in terms of the computing system overhead needed, and the personal resources utilized to on-board a tenant.

In some scenarios, there may be a relatively large number of tenants who have subscribed to a workload and are awaiting assistance in the on-boarding process. In some current systems, engineers or tenant on-boarding users use an on-boarding computing system to perform on-boarding functionality that is used to configure the tenant computing system and the workload computing system in order to on-board a tenant so the tenant can have desired access to the workload.

The discussion above is merely provided for general background information and is not intended to be used as an aid in determining the scope of the claimed subject matter.

SUMMARY

A tenant model models workload usage of tenants, based upon a set of tenant attributes. The model is applied to a set of tenants waiting to be on-boarded to a workload to identify a metric indicative of likely tenant usage of the workload. A subset, of the set of tenants, are identified for on-boarding, based upon the metric, and on-boarding functionality is controlled to on-board the identified subset of tenants.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As briefly mentioned above, there may be a plurality of tenants waiting to be on-boarded to a hosted service (or workload). Different tenants are likely to engage with and use the workloads, to which they are on-boarded, at different rates and at different levels. For instance, one tenant may be relatively large, in that it has obtained a relatively large number of licenses or seats to a workload, but the tenant may have a relatively low rate of usage of the workload. Another tenant, on the other hand, may be smaller, in that it has obtained fewer licenses for the workload, but the usage rate may be much higher. Thus, the rate of usage of the workload may be substantially unaffected when the first tenant is on-boarded, but may be significantly increased when the second tenant is on-boarded.

Some current on-boarding computing systems have a very large footprint so that the first and second tenants can both be on-boarded substantially simultaneously. However, the footprint of the on-boarding computing system may be unnecessarily large, given the overall effect on usage of the workload. For instance, if the second tenant were on-boarded first, then the usage level of the workload may be significantly increased, even if the first tenant is not on-boarded at all. In that scenario, the footprint of the on-boarding computing system can be much smaller, but the usage rate of the workload may still be increased by substantially the same amount.

The present discussion proceeds with respect to generating a model that models likely tenant usage of a workload and that identifies tenants that will have a high impact on the usage of the workload. Those tenants can be selected for on-boarding ahead of other tenants that will have a much lower impact on usage of the workload. In this way, a similar overall increase in usage or expansion of the workload may be obtained, but the footprint of the on-boarding computing system may be significantly smaller than if the model were not applied and tenant selection were not performed. Thus, the present description proceeds with respect to a system and method that significantly improve the overall on-boarding computing system by significantly reducing its footprint in terms of computing overhead, memory, etc., needed to obtain a very similar overall effect on workload usage and expansion as a much larger system where no model application and tenant selection are performed. In fact, using the present system, a much smaller tenant on-boarding computing system can be used to obtain a much larger increase in overall usage and expansion of the workload, and it can be achieved more quickly.

Figure 1:
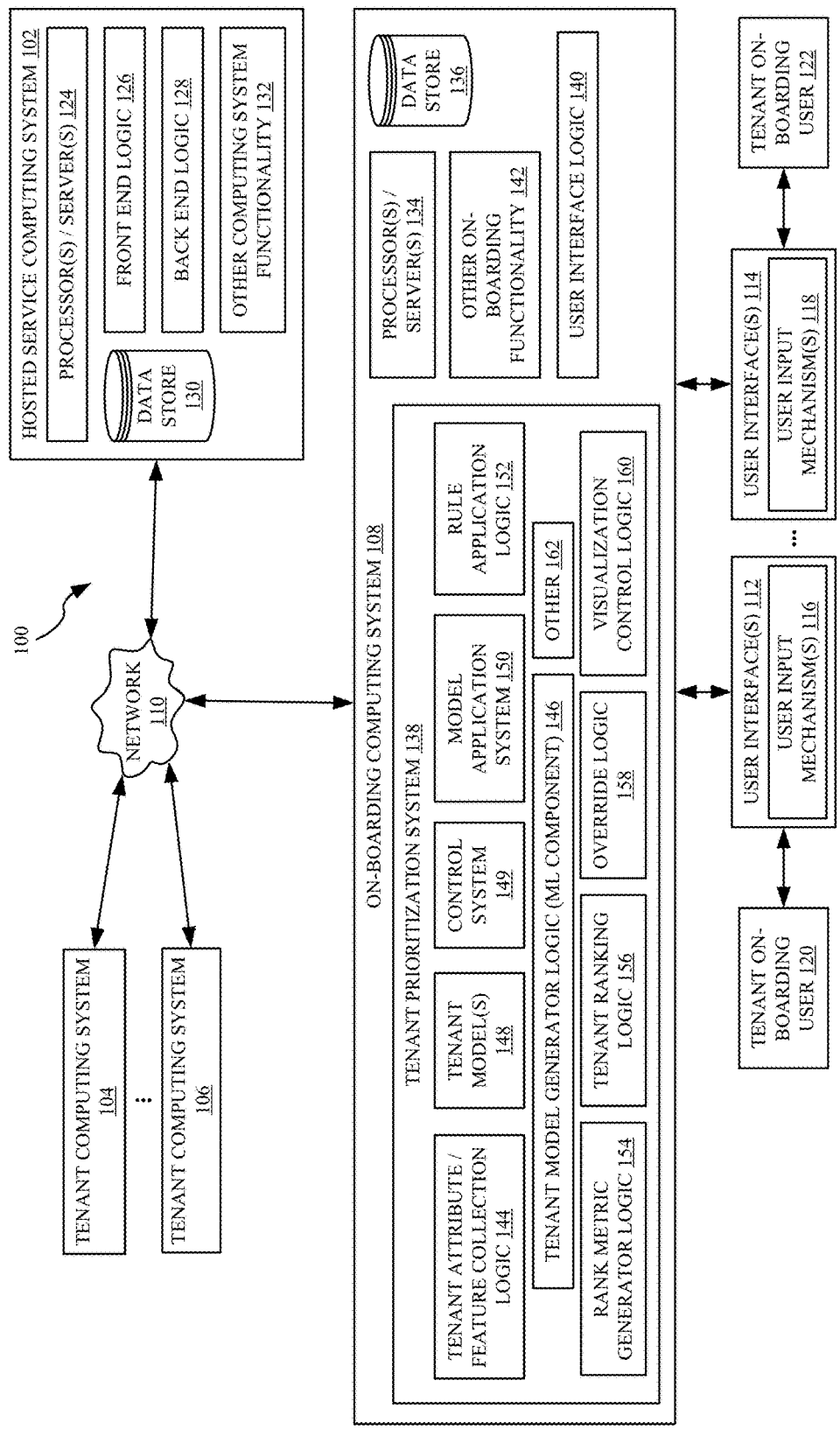
FIG. 1 is a block diagram of one example of a computing system architecture.

FIG. 1 is a block diagram showing one example of a computing system architecture 100. Architecture 100 includes hosted service computing system 102 that is connected to one or more tenant computing systems 104-106, and on-boarding computing system 108, over network 110. Network 110 can be a wide area network, a local area network, a cellular communication network, a near field communication network, or any other of a wide variety of different networks or combinations of networks.

In one example, hosted service computing system 102 hosts a service (or workload) for tenants running tenant computing systems 104-106. In order to access the services hosted by hosted service computing system 102, the tenant computing systems 104-106 must be "on-boarded". By on-boarding, it is meant that tenant computing systems 104-106 or hosted service computing system 102, or both, are configured so that tenants, using tenant computing systems 104-106, can access the service hosted by hosted service computing system 102. Therefore, in one example, on-boarding computing system 108 generates user interfaces 112-114, with user input mechanisms 116-118, for interaction by tenant on-boarding users 120-122. Users 120-122 illustratively interact with user input mechanisms 116-118, respectively, in order to control and manipulate on-boarding computing system 108, and portions of hosted service computing system 102 and possibly portions of tenant computing systems 104-106. Users 120-122 do this in order to configure tenant computing systems 104-106 and hosted service computing system 102 so that the tenants using systems 104-106 can access and use the service hosted by hosted service or workload computing system 102.

At times, there can be a relatively large number of tenants using different tenant computing systems 104-106, that are waiting to be on-boarded to the hosted service. Therefore, users 120-122 must select one of the different tenants and perform on-boarding functionality so that those tenants can use the hosted service. In one example, the users 120-122 wish to quickly expand the usage of the hosted service to the largest possible extent, using the least computing resources in on-boarding computing system 108. In some current systems, users 120-122 simply select the tenant computing systems 104-106 for on-boarding based upon who subscribed to the hosted service first (that is, based on a first-in, first-out order). However, it may be that some of the tenants waiting to be on-boarded will have a high impact on expansion of the hosted service because they will use it more prolifically, and thus expand the usage of the hosted service within the corresponding tenant. At the same time, other tenants may be tenants which are likely to use (or engage with) the hosted service less, and they may be tenants that are more likely to stop using it after a relatively short period of time. Thus, such tenants will have a relatively small impact on expansion of the hosted service. Therefore, in order to ensure that the high impact tenants are on-boarded quickly, some prior systems have expanded the footprint of on-boarding computing system 108 so that more tenants can be on-boarded at the same time. This is because it is difficult for users 120-122 to discern which of the tenants that are waiting to be on-boarded will have a relatively high impact, and which will have a relatively low impact, on the usage and expansion of the hosted service.

In architecture 100, however, on-boarding computing system 108 generates a model that models tenant engagement and usage behavior relative to the hosted workload. The model can be applied to the tenants waiting to be on-boarded to determine which are likely to increase the usage, and thus expand engagement with the hosted service. It can also identify those tenants which are not likely to have a great impact on expansion of the hosted service. Thus, the tenants that will have a high impact can be on-boarded first and therefore usage of the hosted service can be expanded, without expanding the footprint of on-boarding computing system 108. That is, the on-boarding computing system can on-board tenants so that the usage and expansion of the hosted service is at a high rate, even with a relatively small footprint, because the tenants that will have significant impact on the usage and expansion of the hosted service can be identified ahead of time, and prioritized for on-boarding. This, reduces the overall footprint of the on-boarding computing system 108, thereby reducing the amount of processing overhead and memory resources needed to perform on-boarding, but still achieves substantially the same rate of expansion of the hosted service.

Before describing the operation of architecture 100 in more detail, a brief overview of some of the items in architecture 100, and their operation, will first be provided. Hosted service computing system 102 illustratively includes one or more processors or servers 124, front end logic 126, back end logic 128, data store 130, and it can include a wide variety of other computing system functionality 132. Front end logic 126 illustratively provides a computing system front end to tenants who subscribe to, and use, the hosted service. Back end logic 128 can perform operations on data stored in data store 130, and it can communicate with other services, and perform other back end functions.

On-boarding computing system 108 illustratively includes one or more processors or servers 134, data store 136, tenant prioritization system 138, user interface logic 140, and it can include a wide variety of other on-boarding functionality 142. Tenant prioritization system 138, itself, illustratively includes tenant attribute/feature collection logic 144, tenant model generator logic (or machine learning component) 146, one or more tenant models 148, control system 149, model application system 150, rule application logic 152, rank metric generator logic 154, tenant ranking logic 156, override logic 158, visualization control logic 160, and it can include a wide variety of other items 162.

Tenant attribute/feature collection logic 144 illustratively collects important features from a set of tenants and provides them to tenant model generator logic 146. The features are indicative of the usage patterns (such as the level of usage, the level of engagement, the length of usage and engagement, and other features) of tenants that have subscribed to the hosted service. Tenant model generator logic 146 illustratively generates a model that models the engagement/usage behavior of those tenants and provides tenant models 148. In one example, the tenant models 148 include an active potential model and a usage potential model. The active potential model illustratively, when applied to a potential new tenant, provides a metric indicative of whether and to what extend the tenant will be active on the hosted service. The usage potential model illustratively provides a metric indicative of the rate of usage of that tenant. For instance, it provides an output indicative of the likely usage potential of the tenant, for the service under analysis. The usage potential may be, for instance, the likely percent of licensed users that will actually use the service. Of course, it can be provided in terms of other metrics as well.

Model application system 150 illustratively uses tenant attribute/feature collection logic 144 to collect attributes or features of tenants 104-106 that are waiting to be on-boarded. It then applies the tenant models 148 to generate metrics indicative of the active potential and usage potential of those tenants. Rule application logic 152 can apply rules to the metrics, to modify those metrics. The rules may be indicative of things that are not easily modeled by models 148. For instance, they may be rules that do not have sufficient data to support them, so that they cannot be incorporated into the machine learned models. They may reflect the goals or other decisions made by tenant on-boarding users 120-122. They may be other rules as well.

Override logic 158 illustratively allows users 120-122 to override the metric values output by the models and after rules are applied by the rule application logic 152. For instance, it may be that user 120 knows, personally, that a particular tenant is not ready for on-boarding. Therefore, even though the models 148 generate a metric indicating that the tenant is ready for on-boarding, it may be inaccurate based upon the personal knowledge of user 120. Thus, override logic 158 illustratively provides an interface that allows user 120 to override the output of the model and the output of rule application logic 152.

Rank metric generator logic 154 can take the metrics generated by each of the models 148 and the rule application logic 152, and combine them into a single metric or a set of metrics that are used to rank the tenants using tenant computing systems 104-106 in terms of which should be chosen first for on-boarding. Tenant ranking logic 156 then generates a rank ordered list of tenants for on-boarding so that the highest ranked tenants can be chosen first. Tenant ranking logic 156 can generate a rank ordered list for all tenants 104-106, for certain subsets of tenants that are assigned to different users or groups of users 120-122, it can rank each of the services that need to be on-boarded for each of the tenants, and it can generate other rank ordered lists as well. Some of these are described in greater detail below.

Visualization control logic 160 illustratively controls user interface logic 140 to generate or surface a visualization or other interface that represents the rank ordered list. It can be an interactive list in which the entries of the list are actuatable elements that, when actuated, can navigate the user 120-122 to more detailed information. They can be other rank ordered lists as well.

Based on the rank ordered list, control system 149 can control various items or functions in computing system 108. For instance, control system 149 can control the footprint of computing system 108 to free or allocate more memory resources, instances of virtual machines or other processing and memory resources, based on a number of tenants in the rank ordered list that will have a relatively high impact on the expansion or usage of the hosted service. It can control other functionality as well.

Once the rank ordered list is generated for a user (such as user 120), the user 120 can select a tenant that is highest ranked (or near the top of the rank ordered list) for on-boarding. This will assist the users 120-122 in selecting those tenants which are more likely to increase the overall usage level of the hosted service, or expand usage of the hosted service, before tenants that are likely to have lower impact on the usage or expansion of the hosted service. In this way, the footprint of on-boarding computing system 108 can be maintained at a relatively small size, but still achieve higher usage levels and expansion of the hosted service, because the highest impact tenants are identifiable and can therefore be on-boarded first.

A number of the items in tenant prioritization system 138 will now be described in more detail. Then, a more detailed description of the operation of tenant prioritization system 138 will be provided.

Figure 2:
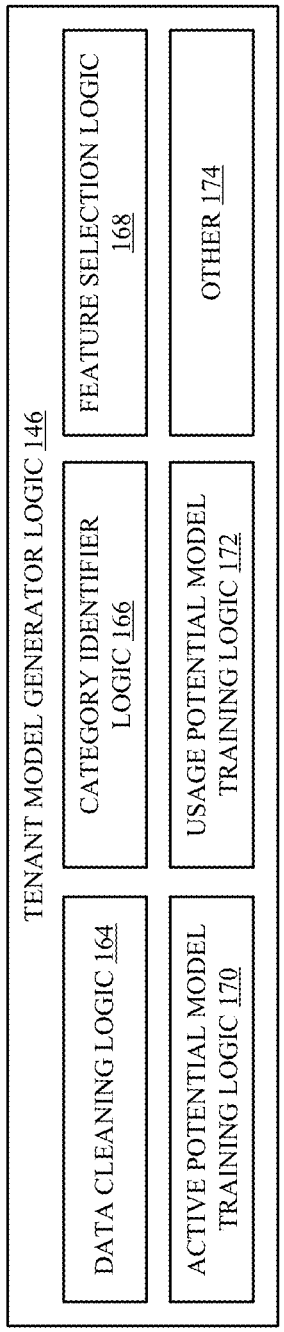
FIG. 2 is a block diagram showing one example of tenant model generator logic in more detail.

FIG. 2 is a block diagram showing one example of tenant model generator logic, in more detail. Tenant model generator logic 146 can include data cleaning logic 164, category identifier logic 166, feature selection logic 168, active potential model training logic 170, usage potential model training logic 172, and it can include other items 174. Data cleaning logic 164 illustratively obtains the tenant attributes or features collected by collection logic 144 and cleans them or prepares them for training tenant models 148. In one example, it obtains a relatively large number of attributes (such as an excess of 90 attributes) about the tenant and the workload under analysis. It can clean the data by converting categorical values into numeric identifiers or numeric values for model consumption. It can also remove sparse features which may tend to cause noise in the model.

Once the data is cleaned, category identifier logic 166 identifies whether different models need to be generated for different categories of tenants. For example, it may be that the attributes or features vary significantly between tenants of different sizes (such as between a tenant that purchased a relatively large number of seats for the hosted service and one that purchased a relatively small number of seats). Therefore, category identifier logic 166 may identify multiple different categories, based on tenant size, and each category may have its own model or set of models trained for it. In one example, category identifier logic 166 identifies three different size categories for the tenants. This means that three different sets of models are generated based on features or attributes from tenants in those size categories. The three different sets of models can then be applied to tenants of different sizes. For instance, the models generated from the features or attributes of tenants that are in the category with the highest seat sizes may be applied to tenants, waiting to be on-boarded, that correspond to that category. The set of models that was generated for tenants in the middle category (that have purchased a middle number of seats for the hosted workload) may be applied to tenants that are waiting to be on-boarded, corresponding to that category. The set of models that were generated from attributes or features of tenants in the lowest category (those that had the lowest number of seats) can be applied to tenants waiting to be on-boarded, corresponding to that category.

Feature selection logic 168 then identifies the particular features that are important in predicting a tenant's active behavior and usage behavior for a selected service or workload. Feature selection logic 168 may use any of a variety of different approaches to select the features. In one example, the features can be selected in the order of importance in predicting tenant active and usage potential. For instance, filter-based feature selection can be used. Permutation feature importance can be used, or a variety of other feature selection approaches can be used as well.

Active potential model training logic 170 then trains an active potential model which is configured to generate a metric that is indicative of a tenant's likely active potential. For instance, the tenant may likely be highly active on the hosted service, moderately active, or not very active. Thus, logic 170 illustratively trains a model that generates an indication of whether the tenant's active potential is high, medium or low.

Similarly, usage potential model training logic 172 illustratively trains a usage potential model indicative of the tenant's likely usage potential for the hosted service. The usage potential is illustratively indicative of a percent of possible users that will likely use the service for the given tenant. By way of example, assume that a tenant has purchased 100 licenses for a hosted service. The usage potential model illustratively outputs an indication as to what percent of those possible 100 licenses will actually be used in using the hosted service. If a relatively high percent are likely to use the hosted service, the model illustratively outputs an indicator that shows that the usage potential for the tenant is high. If a moderate percent of users are likely to use the hosted service, the model outputs an indicator showing that the usage potential is medium, and otherwise the model outputs an indicator showing that the usage potential for the tenant is low. In one example, if the usage potential is in excess of 20% usage, then the model outputs a high indicator. If it is from 5-20%, the model outputs a usage potential indictor of medium, and if it is less than 5%, the model outputs a usage potential indicator of low.

Active potential model training logic 170 and usage potential model training logic 172 can use any of a wide variety of different types of learner algorithms in order to train the model with sample data. The algorithms can include FastTree (BoostedTrees) regression model training with least error (root mean square error) chosen to train the model. Also, in one example, the sample data may be taken from tenants that have used the hosted service for a threshold amount of time (such as 6 months, 9 months, etc.). The threshold amount of time can also vary based upon the size of the tenant. Of course, other learner algorithms can be used as well, such as a batch linear regressor algorithm, a Bayesian linear regressor algorithm, a Poisson regression algorithm, a regression neural network learning algorithm, a Gemini decision forest regressor algorithm, among others.

Once tenant model generator logic 146 has generated the different sets of models for the different categories, model application system 166 can apply those models to tenants that are waiting to be on-boarded, in order to generate a metric indicative of when they should be chosen for on-boarding, relative to other tenants that are waiting to be on-boarded.

Figure 3:
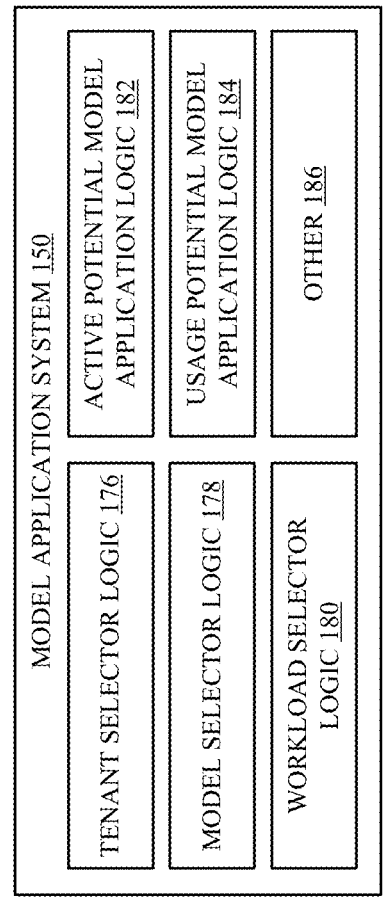
FIG. 3 is a block diagram showing one example of a model application system in more detail.

FIG. 3 is a block diagram showing one example of model application system 150 in more detail. Model application system 150 illustratively includes tenant selector logic 176, model selector logic 178, workload selector logic 180, active potential model application logic 182, usage potential model application logic 184, and it can include other items 186. When model application system 150 is requested to identify tenants for on-boarding, tenant selector logic 176 selects a tenant to which the models will be applied. Model selector logic 178 selects the set of models to apply to the selected tenant, based upon the category that the tenant falls into. For instance, if the categories are large, medium and small size tenants, then model selector logic 178 selects the appropriate set of models based upon the size of the tenant being analyzed. Workload selector logic 180 selects a workload so that the appropriate models can be applied to the tenant. For instance, if the tenant is being on-boarded to five different workloads, there may be five different sets of models that model the likely active and usage patterns of the tenant in those different workloads. Active potential model application logic 182 then applies the active potential model to the selected tenant, for the selected workload. Usage potential model application logic 184 then applies the appropriate usage potential model to the selected tenant for the selected workload. The models generate outputs indicative of the likely active potential and usage potential for the selected client, for the selected workload.

Figure 4:
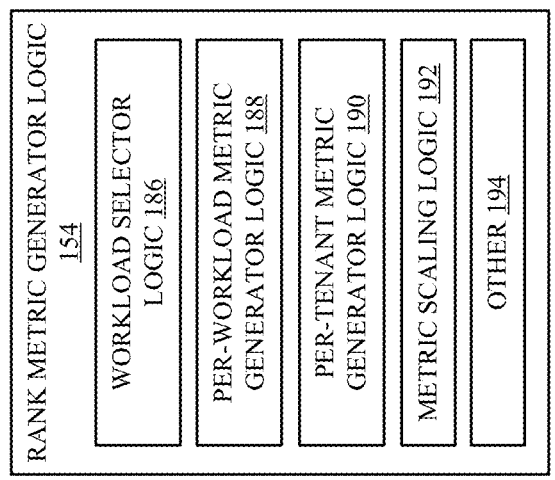
FIG. 4 is a block diagram showing one example of rank metric generator logic in more detail.

The outputs of the models can then be provided to rank metric generator logic 154, one example of which is shown, in more detail, in FIG. 4. Logic 154 then illustratively generates metrics that can be used to rank the tenant under analysis in a variety of different ways. For instance, the tenant can be ranked on a per-workload basis, on a per-tenant basis, or in other ways. Thus, in one example, rank metric generator logic 154 includes workload selector logic 186, per-workload metric generator logic 188, per-tenant metric generator logic 190, metric scaling logic 192, and it can include a wide variety of other items 194. If the tenant is being on-boarded to a plurality of different workloads, the workload selector logic 186 selects one of the workloads to analyze. Per-workload metric generator logic 188 generates a ranking metric for the selected workload. This continues for all of the workloads that the selected tenant will be on-boarded to. Per-tenant metric generator logic 190 then generates a tenant level ranking metric that combines the workload level ranking metrics for the tenant. Metric scaling logic 192 then scales the tenant level metric so that it can be compared to the tenant level metrics for other tenants.

Figure 5:
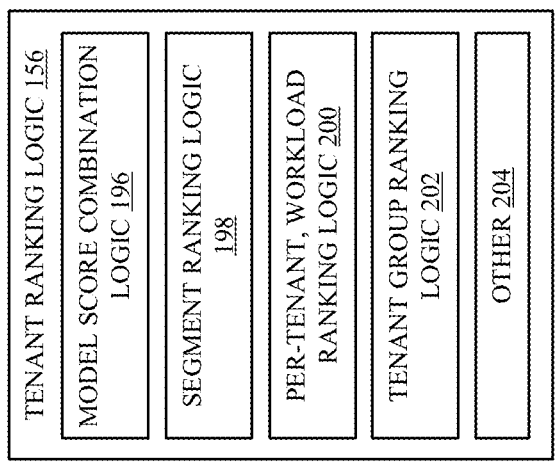
FIG. 5 is a block diagram showing one example of tenant ranking logic in more detail.

The ranking metrics are then illustratively provided to tenant ranking logic 156 which ranks the various tenants, waiting to be on-boarded, based upon the ranking metrics. One example of logic 156 is shown, in more detail, in FIG. 5. Tenant ranking logic 156 illustratively includes model score combination logic 196, segment ranking logic 198, per-tenant service ranking logic 200, tenant group ranking logic 202, and it can include a wide variety of other items 204. Model score combination logic 196 illustratively combines the tenant ranking scores generated by each of the different tenant models, for the selected tenant. For instance, the active potential model may generate an output indicative of the likely active potential of the tenant, while the usage potential model may generate a model indicative of the likely usage potential of the tenant. Those two outputs can be combined into a single tenant ranking metric by model score combination logic 196.

Segment ranking logic 198 illustratively generates a rank ordered list of tenants in each category or segment. For instance, it may generate a rank ordered list of all large tenants waiting to be on-boarded and a separate rank ordered list for all medium tenants waiting to be on-boarded and yet another list for all small tenants waiting to be on-boarded. Tenant group ranking logic 202 can generate rank ordered lists for other groups or subsets of tenants that are waiting to be on-boarded. For instance, it may be that a particular tenant on-boarding user 120 is working with a specific set of tenants. In that case, tenant group ranking logic 202 can rank those tenants and generate a rank ordered list of only the tenants that user 120 is working with. This is just one example of the type of group of tenants for which a rank ordered list can be generated, and others are contemplated herein as well.

Per-tenant, service ranking logic 200 illustratively ranks the services for each tenant to indicate which service should be on-boarded first for a given tenant. For instance, if a tenant is waiting to be on-boarded to five different hosted services, then the tenant can be selected for on-boarding based upon the overall tenant ranking metrics. However, once the tenant is selected for on-boarding, users 120-122 may wish to know which particular service to on-board first, for that tenant. Therefore, logic 200 generates a ranking indicator that ranks the particular services or workloads, for each individual tenant, to indicate which service or workload should be selected first, for on-boarding.

Figure 6:
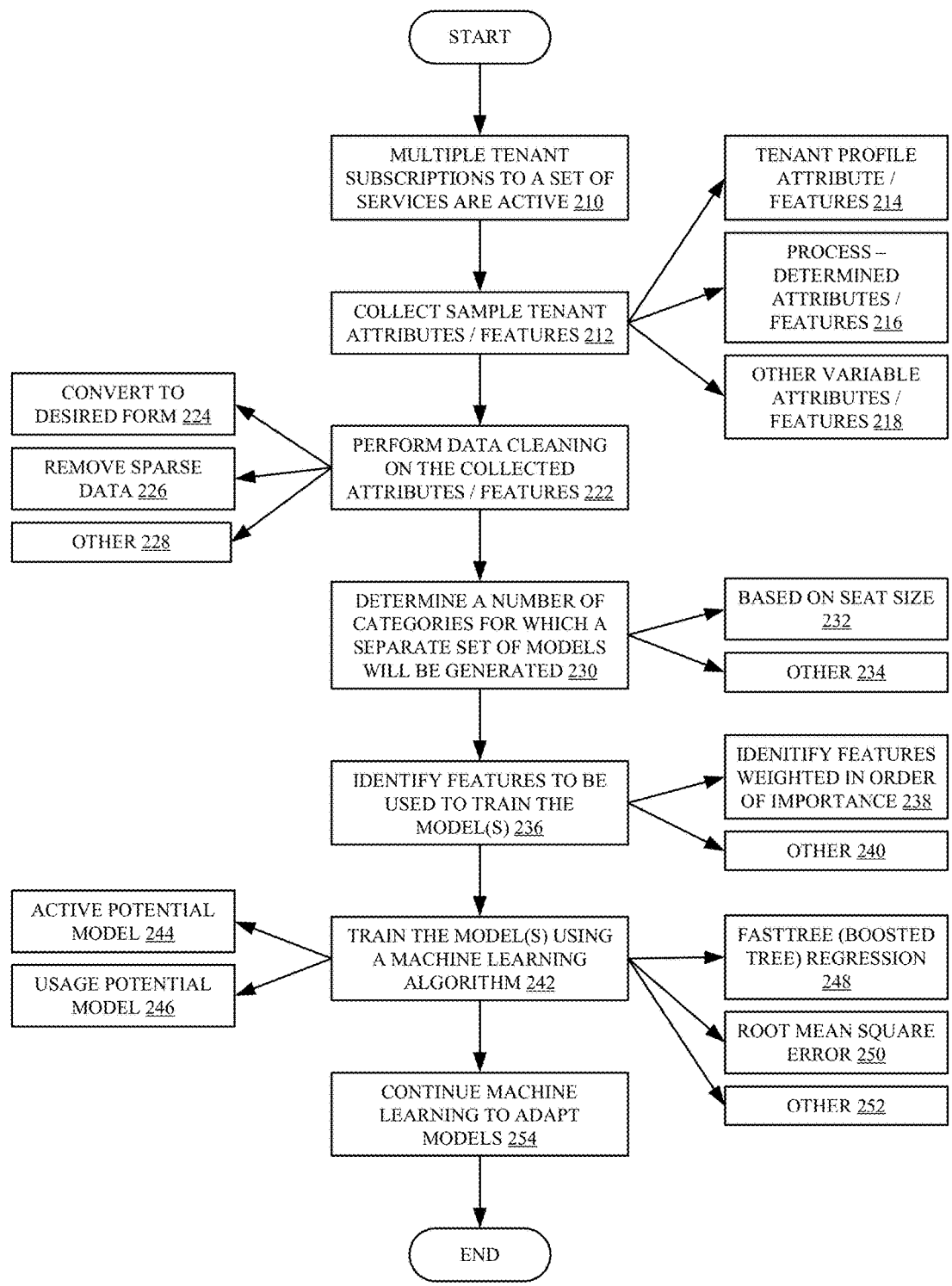
FIG. 6 is a flow diagram illustrating one example of the operation of the architecture shown in FIG. 1 in generating one or more tenant models.

FIG. 6 is a flow diagram illustrating one example of the operation of tenant model generator logic 146, in architecture 100, in generating one or more tenant models based on attributes or features obtained from the tenant, relative to a workload being on-boarded. It is first assumed that multiple tenant subscriptions to a set of services or workloads are active. This is indicated by block 210 in the flow diagram of FIG. 6. The multiple tenants are illustratively tenants that have varying degrees of usage and activity on the one or more services or workloads. Therefore, their activity and usage patterns can be modeled, based upon the attributes and features, and the model can be used to predict whether a different tenant is likely to use, and be active on, the service or workload. Similarly, the models can be used to predict whether a current tenant will use, and be active on, a different service that they are waiting to be on-boarded to.

Tenant model generator logic 146 then uses tenant attribute/feature collection logic 144 to collect various sample tenant attributes or features that can be used to train the various tenant models 148. This is indicated by block 212. The attributes can include such things as tenant profile attributes or features 214. These types of features or attributes include the size of the tenant, the number of seats purchased by the tenant, the configuration of the tenant in terms of the number of physical facilities of the tenant, where the facilities are located, etc.

The attributes and features can also include process-determined attributes or features 216. These can be features that change, based upon the process of on-boarding a tenant to the workload or service. For instance, the process-determined attributes or features 216 can include a number of days in each of the on-boarding phases. They may be attributes or features that cannot be changed until they are changed by the on-boarding process itself.

The attributes and features that are collected can also include a wide variety of other variable attributes or features 218. These types of attributes or features may indicate such things as whether the on-boarding process has a stakeholder at the tenant, information such as why the tenant is seeking to use the service or workload, whether the tenant has a particular contact person who is influential in getting users at the tenant to use the workload or service, among other things.

Once the sample attributes or features are collected from the various tenants, data cleaning logic 164 performs data cleaning on those attributes or features. This is indicated by block 220. For instance, the data cleaning can include converting the attributes or features to a desired form (such as to numeric form). This is indicated by block 224. It can include removing sparse data as indicated by block 226. It can include a wide variety of other data cleaning operations as well, and this is indicated by block 228.

Once the data is cleaned, category identifier logic 166 illustratively determines a number of categories for which a separate set of models will be generated. This is indicated by block 230. For instance, this can be based on logic 166 dividing the sample tenants into different size categories, as indicated by block 232. It can be based on other categorization criteria as well, and this is indicated by block 234.

Feature selection logic 168 then identifies features to be used to train the models. Those features may be a subset of the collected features or attributes. This is indicated by block 236. For instance, feature selection logic 168 may identify the different collected features in order of their importance in predicting the active potential and usage potential of a tenant. This is indicated by block 238. Features having a sufficient importance level (such as those above a cut-off threshold) may be chosen to train the model. Identifying the features can be performed in other ways as well, and this is indicated by block 240.

Active potential model training logic 170 and usage potential model training logic 172 then train the models using a machine learning algorithm. This is indicated by block 242. The active potential model is indicated by block 244 and the usage potential model is indicated by block 246. In one example, the FastTree (BoostedTree) regression algorithm can be used, and this is indicated by block 248. The error chosen in the training algorithm can be the root mean square error as indicated by block 250. Other algorithms and training criteria can be used as well, and this is indicated by block 252.

In one example, each of the items of training logic 170 and 172 include a machine learning component. Therefore, additional features or attributes can be obtained from different tenants, as they continue to use the workload or service. Those additional features or attributes can be incorporated, using the machine learning component, to adapt the models based on the new features or attributes, or the new values for those features or attributes. Using machine learning to continue to adapt the models is indicated by block 254 in the flow diagram of FIG. 6.

Figure 7A:
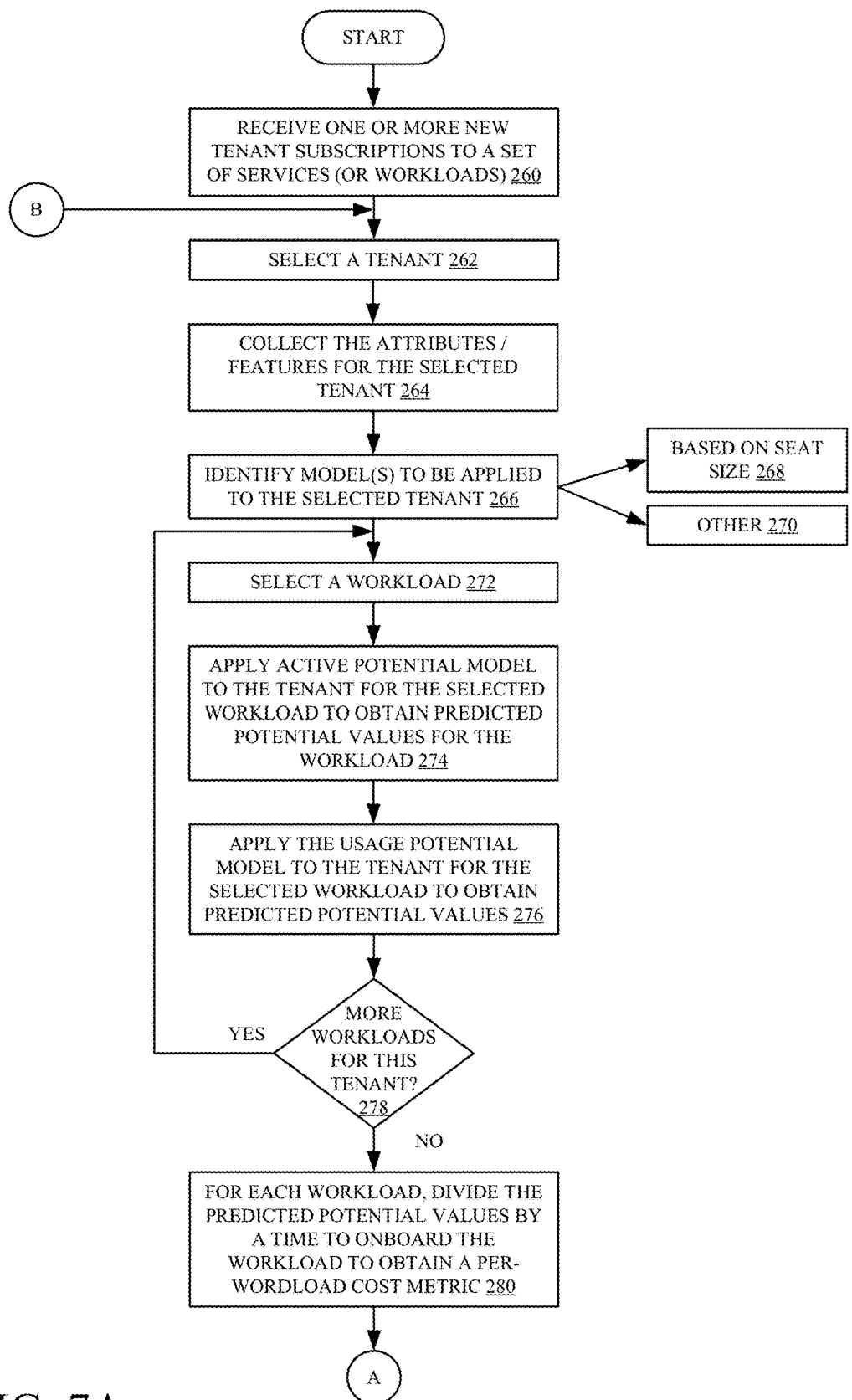
FIGS. 7A and 7B (collectively referred to herein as FIG. 7) illustrate a flow diagram showing one example of the operation of the architecture shown in FIG. 1 in applying tenant models to a set of tenants.
Figure 7B:
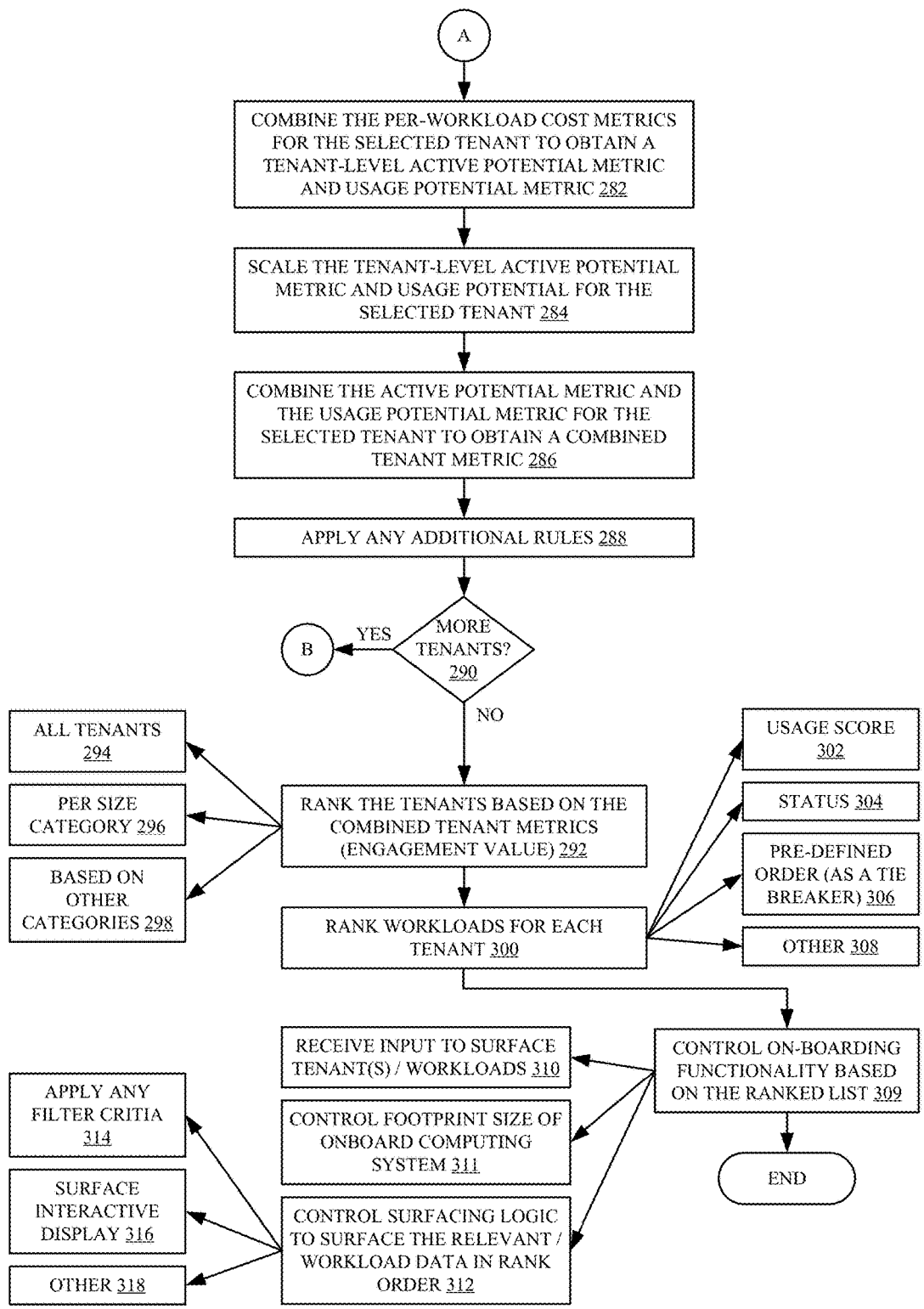

FIGS. 7A and 7B (collectively referred to herein as FIG. 7) show a flow diagram illustrating one example of the operation of architecture 100 in applying the models to tenants that are waiting to be on-boarded. It also illustrates the operation of architecture 100 in ranking those tenants in various ways and surfacing the rank ordered list of tenants.

It is first assumed that on-boarding computing system 108 receives an indication that one or more new tenants have subscribed to a set of services (or workloads) or that an existing tenant has subscribed to receive an additional service or workload. This is indicated by block 260 in the flow diagram of FIG. 7. These one or more new tenants are the tenants 104-106 that are waiting to be on-boarded to the set of workloads or services.

Tenant selector logic 176 then selects one of the tenants waiting to be on-boarded, so that the ranking metrics can be generated for the selected tenant. This is indicated by block 262. It will be appreciated that multiple tenants can be selected and processed simultaneously, or in parallel, as well. Selecting and processing one tenant at a time is described herein for the sake of example only.

Model application system 150 then controls tenant attribute/feature collection logic 144 to collect the attributes or features for the selected tenant, so that the tenant models 148 can be applied to the tenant, using those attributes or features. Collecting the attributes or features for the selected tenant is indicated by block 264.

Model selector logic 178 then identifies the models to be applied to the selected tenant. This is indicated by block 266. It may include identifying a particular category that the tenant falls into (such as a size category) as indicated by block 268. The models that were generated for tenants in that size category can then be selected for application to the tenant. The models to be applied to the selected tenant can be identified in a wide variety of other ways as well, and this is indicated by block 270.

As described above, the models can be applied to generate a ranking metric for each particular workload or service that the tenant is waiting to be on-boarded to. Those ranking metrics can then be combined to obtain a tenant level ranking metric. Therefore, at this point, workload selector logic 180 selects a workload for which a ranking metric is to be generated, for the selected tenant. This is indicated by block 272. Active potential model application logic 182 then applies the active potential model to the tenant, for the selected workload, to obtain active potential values for this workload, for this tenant. This is indicated by block 274.

Usage potential model application logic 184 then applies the usage potential model to the tenant for the selected workload in order to obtain predicted potential values for the tenant with respect to the selected workload. This is indicated by block 276. If there are more workloads to be analyzed for this tenant, then workload selector logic 180 selects the next workload and processing reverts to block 272-276. This is indicated by block 278 in the flow diagram of FIG. 7.

The values generated by applying the models are then output to rank metric generator logic 154. Workload selector logic 186 then selects a workload so that rank metrics can be generated for that workload, for the selected client. Per-workload metric generator logic 188 then generates a per-workload metric which can be used in ranking the tenant with respect to that workload.

Once all the workloads have been analyzed for the selected tenant, then, for each workload, the value generated by the various models is divided by a time to on-board the workload to obtain a per-workload cost metric. For instance, the active potential metric for a particular workload and a particular tenant is divided by the number of days that it will take to on-board that tenant to that workload. This gives a cost metric corresponding to on-boarding the tenant to that workload. Obtaining a per-workload cost metric is indicated by block 280 in the flow diagram of FIG. 7.

Per-tenant metric generator logic 190 then combines the per-workload cost metrics for the selected tenant to obtain a tenant-level active potential metric and usage potential metric. This is indicated by block 282 in the flow diagram of FIG. 7. The per-workload metrics can be combined by adding them together, or otherwise combining them.

Metric scaling logic 192 then scales the tenant-level active potential metric and usage potential metric for the selected tenant. This is indicated by block 284. In one example, the metrics are scaled by standardizing them to a scale of 0-100 using a feature scaling method, but scaling can be done in a wide variety of other ways. The active potential metric and the usage potential metric for the selected tenant are then combined to obtain a combined tenant metric. The rank metrics generated by logic 154 can then be output to tenant ranking logic 156 which can generate the rank ordered list of tenants in various ways.

tenant. Table 1 also shows a predicted active value column for each workload, and a cost to on-board (in terms of the number of days needed to on-board column the client for that workload). Thus, the result of dividing the predicted potential by the cost to on-board for each workload is shown in its own column. The overall cost, which is obtained by adding all the cost functions in together, for the tenant, is shown in the sixth column and these values are repeated in column seven as a single metric per-tenant. Because there are three tenants, the highest value of the three tenants will be scaled to 100 and the lowest will be scaled to 0. Therefore, it can be seen, based upon the cost value metrics, Tenant 1 is scaled to 0 in the scaling column and Tenant 3 is scaled to 100. The ranks are thus assigned (low to Tenant 1, medium to Tenant 2 and high to Tenant 3). The scaling can be performed, for instance, by obtaining the maximum single value per-tenant and subtracting from it the minimum single value per-tenant. In the case of the example shown in Table 1, this would 86.2069–4.888137. The scaled value can then be obtained by taking the predicted value for a tenant (the total for all workloads for that tenant) and subtracting the minimum total value for all workloads for a tenant and dividing it by the factor which was obtained by subtracting the minimum value from the maximum value. The result of that operation can then be multiplied by 100 to obtain the scaled value. By doing this, the scaled value for Tenant 1 is calculated as follows:

$$\frac{(4.888137 - 4.888137)}{81.31876} = 0 \quad \text{Equation 1}$$

The scaled value for Tenant 2 can be calculated as follows:

$$\frac{(8.95317 - 4.888137)}{81.31876} * 100 = 4.998887 \quad \text{Equation 2}$$

The scaled value for Tenant 3 can be obtained as follows:

$$\frac{(86.2069 - 4.888137)}{81.31876} = *100 = 100 \quad \text{Equation 3}$$

TABLE 1

|  | Workload | Predicted Value | Cost (Days) to On-board | Divide Potential by Days to On-board | Total For All Workloads | Single Value Per Tenant | Scaling | Rank |
|---|---|---|---|---|---|---|---|---|
| Tenant 1 | Workload 1 | 100 | 139 | 0.719424 | 4.888137 | 4.888137 | 0 | 3 (low value) |
|  | Workload 2 | 500 | 149 | 3.355705 |  |  |  |  |
|  | Workload 3 | 100 | 123 | 0.831008 |  |  |  |  |
| Tenant 2 | Workload 4 | 200 | 116 | 1.724138 | 8.95317 | 8.95317 | 4.998887 | 2 |
|  | Workload 5 | 450 | 124 | 3.629032 |  |  |  |  |
|  | Workload 6 | 450 | 125 | 3.6 |  |  |  |  |
| Tenant 3 | Workload 4 | 10000 | 116 | 86.2069 | 86.2069 | 86.2069 | 100 | 1 (high value) |

Table 1 shows one example of how the cost value for each workload, and the combined cost value for a client, can be determined. Table 1 shows a column with a list of tenants, and a column with a list of workloads or services for each Table 2 below shows one example of how the two metrics can be combined by combination logic 196. For instance, if the active potential metric for a particular tenant is high and the usage potential is high, then the combined tenant metric may also be high. If the active potential is high and the usage potential is medium, again the combined tenant metric may be high. If the active potential is high but the usage potential is low, then the combined tenant metric may be low. Table 2 shows only one example of how the two metrics can be combined to obtain a combined tenant metric. Using model score combination logic 196 to obtain the combined tenant metric is indicated by block 286 in the flow diagram of FIG. 7.

TABLE 2

| ACTIVE POTENTIAL | USAGE POTENTIAL | TENANT PRIORITY |
|---|---|---|
| High | High | High |
|  | Medium | Medium |
|  | Low | Low |
| Medium | High | High |
|  | Medium | Medium |
|  | Low | Low |
| Low | High | High |
|  | Medium | Medium |
|  | Low | Low |

Once the combined tenant metric has been generated for the selected tenant, rule application logic 152 can be used to apply any additional rules that were not captured in the various tenant modes 148. This is indicated by block 288. If the conditions are met for the rule, then the combined tenant metric can be adjusted. For instance, it may be that the selected tenant is a non-profit tenant. It may also be that a rule applies when a tenant is a non-profit tenant to increase the priority level of that tenant, or to decrease the priority level of that tenant. This is just one way of applying a rule using rule application logic 152.

It will also be noted that, at any point in the processing shown in FIG. 7, override logic 158 may provide an interface allowing one of users 120-122 to override the priority that has been, or is being, generated for the tenant. If the user has personal knowledge that would affect the combined tenant metric, then the user can override the system, at substantially any point.

At block 290, it is determined whether there are additional tenants 104-106 that are waiting for on-boarding, and that have not yet had a combined tenant metric generated for them. If so, processing reverts to block 262 where the next tenant is selected.

Once the tenants that are waiting to be on-boarded have been processed, then tenant ranking logic 156 ranks the tenants based upon the combined tenant metrics. This is indicated by block 292. For instance, all tenants 104-106 can be ranked in a single ranked list. This is indicated by block 294. The tenants can be ranked within different size categories as well, and this is indicated by block 296. The tenants can be ranked based on other categories as well, and this is indicated by block 298.

Per-tenant, workload ranking logic 200 can also illustratively rank the workloads for each tenant in terms of which workload the tenant should be on-boarded to first. Ranking the workloads for each tenant is indicated by block 300 in the flow diagram of FIG. 7. In one example, the workloads can be ranked based on the raw scores output by tenant models 148. For instance, they can be ranked based on the raw usage potential score 302. They can be ranked based on the current status of the tenant, such as where, in the on-boarding process, the tenant currently is. This is indicated by block 304. They can be ranked based on a predefined order (that is, the various workloads may have a predefined order that can be used to rank them relative to one another) as a tie breaker, if all of the previous ranking criteria are indeterminate. Ranking the workloads for each tenant according to a predefined order is indicated by block 306. The workloads can be ranked by active potential score or a wide variety of other ranking criteria as well, and this is indicated by block 308.

Control system 149 then controls on-boarding functionality based on the ranked list. This is indicated by block 309. In one example, it controls the footprint size of on-boarding computing system 108. This is indicated by block 311. For instance, it can modify the amount of computing resources (virtual machines, physical machines, memory, etc.) available for performing on-boarding functions based on the number of high priority (or high impact) tenants that are waiting to be on-boarded. It can do this to increase the size on expansion of the hosted service (or workload) as quickly as desired by comparing the number of high priority tenants to a threshold value, to determine whether to add or remove resources for on-boarding. It can determine when to add or release resources dynamically based on a desired algorithm, or in a wide variety of other ways.

In another example, visualization control logic 160 illustratively receives an input indicating that a user 120-122 wishes to have a rank ordered list of tenants or workloads surfaced for that user. This is indicated by block 310. By way of example, tenant prioritization system 138 may control user interface logic 140 to generate a user interface, with a user input mechanism that allows a user to request such a rank ordered list. The user input mechanism may allow the user to request a rank ordered list of tenants, or a rank ordered list of workloads, for a specific tenant. The tenants that are displayed in the rank ordered list may be all of the tenants that are waiting to be on-boarded, or a subset of tenants (such as those assigned to the requesting user, etc.).

Visualization control logic 160 receives the user input, through the user input mechanism, and controls user interface logic 140 to surface the relevant tenant or workload data, in rank order. This is indicated by block 312 in FIG. 7. The rank ordered list may be filtered by applying any desired filter criteria as indicated by block 314. It may be surfaced as an interactive display so that the user can interact with display elements on the display (such as to drill down into more detailed data, to navigate to a page corresponding to a tenant, etc.). Surfacing an interactive display is indicated by block 316. The rank ordered list can be surfaced in a wide variety of other ways as well, and this is indicated by block 318.

Figure 8:
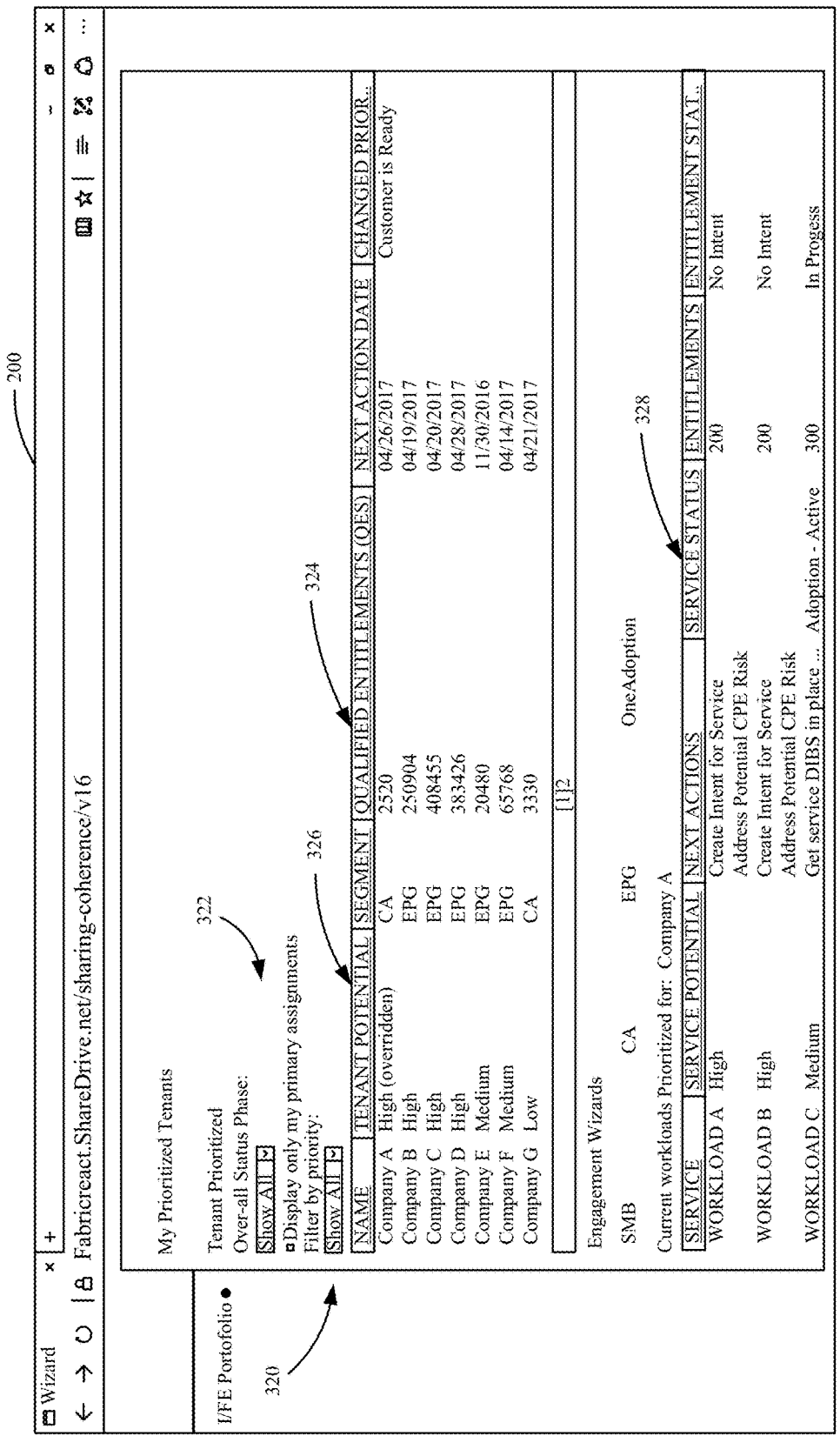
FIG. 8 shows one example of a user interface that can be generated in the architectures shown in the previous figures.

FIG. 8 shows one example of a user interface display 320 that surfaces a rank ordered list of tenants. User interface display 320 includes a filter section 322 that displays user actuatable filters. For instance, the rank ordered list can be displayed based on the status or phase of on-boarding the tenants, based upon who the tenants are assigned to for on-boarding, based upon different priority levels, etc. Display 320 also includes a rank ordered list display section 324. Section 324 displays the tenants (labeled as Company A-Company G) in rank order based upon the combined tenant ranking metric which can also be displayed, such as in column 326. Additional information for each tenant can be displayed, such as the size category that the tenant belongs to, the particular number of seats that have been purchased by the tenant, any due dates for next action items, an indication as to whether the priority of the tenant was changed by a user using override logic 158, or whether it was changed by rule application logic 152, an indication of who such a change was made by, along with a wide variety of other information.

When the user selects a tenant in display portion 324, a workload prioritization display portion 328 can be displayed. Portion 328 illustratively ranks the workloads for the tenant selected in display portion 324. It can also display a wide variety of information corresponding to each workload, such as the workload's priority, the next actions that are due in the on-boarding process for the workload, a status of the on-boarding process, a seat size or number of seats purchased for each workload, an indication as to an amount of active usage of each workload, among a wide variety of other information.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 9:
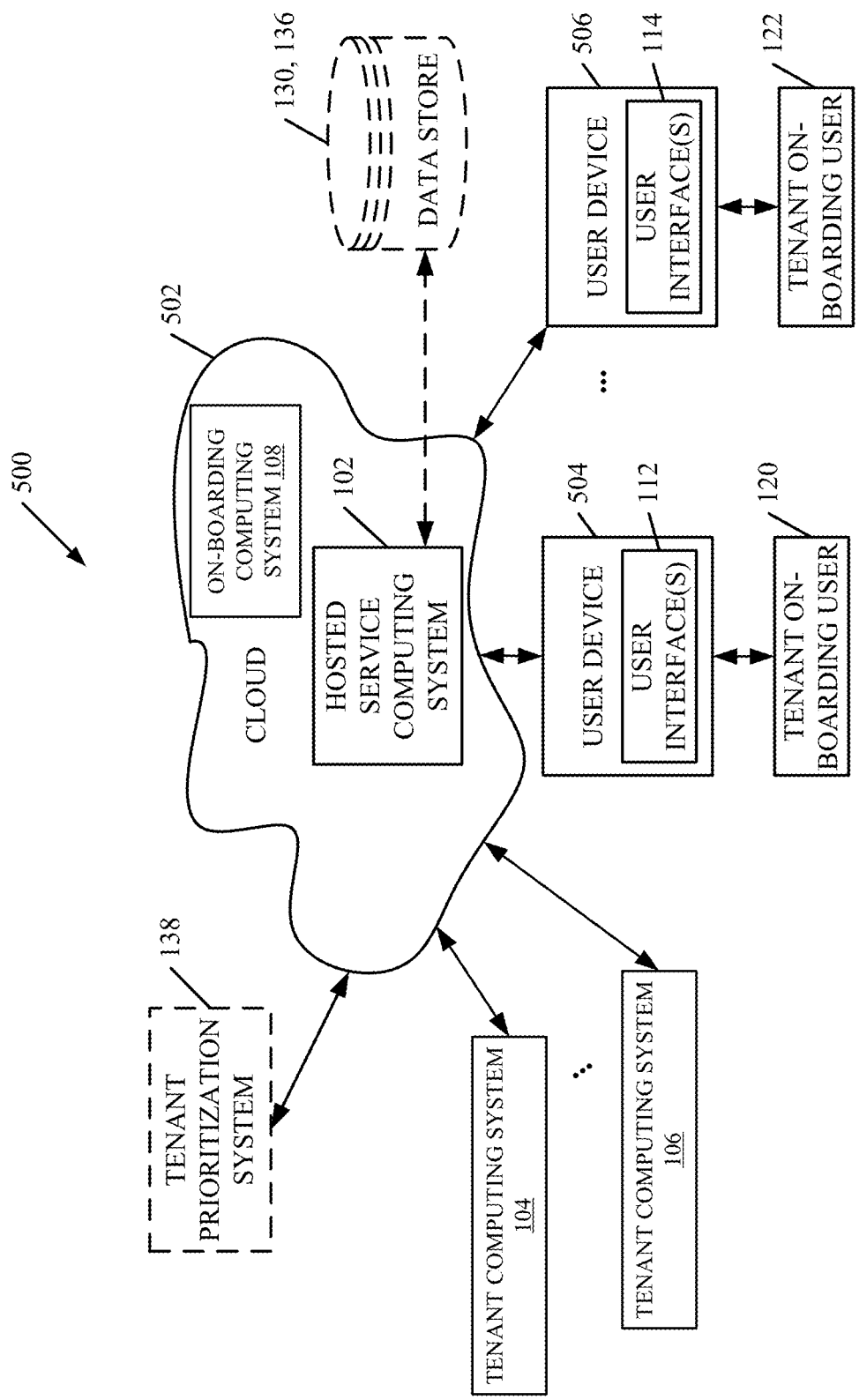
FIG. 9 shows one example of the architecture illustrated in FIG. 1, deployed in a cloud computing architecture.

FIG. 9 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 9, some items are similar to those shown in FIG. 1 and they are similarly numbered. FIG. 9 specifically shows that hosted service computing system 102 and on-boarding computing system 108 can be located in cloud 502 (which can be public, private, or a combination where portions are public while others are private). Therefore, users 120-122 use user devices 504-506 to access those systems through cloud 502.

FIG. 9 also depicts another example of a cloud architecture. FIG. 9 shows that it is also contemplated that some elements of computing systems 102 and/or 108 can be disposed in cloud 502 while others are not. By way of example, data stores 130-136 can be disposed outside of cloud 502, and accessed through cloud 502. In another example, tenant prioritization system 138 (or other items) can be outside of cloud 502. Regardless of where they are located, they can be accessed directly by devices 504-506, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 10:
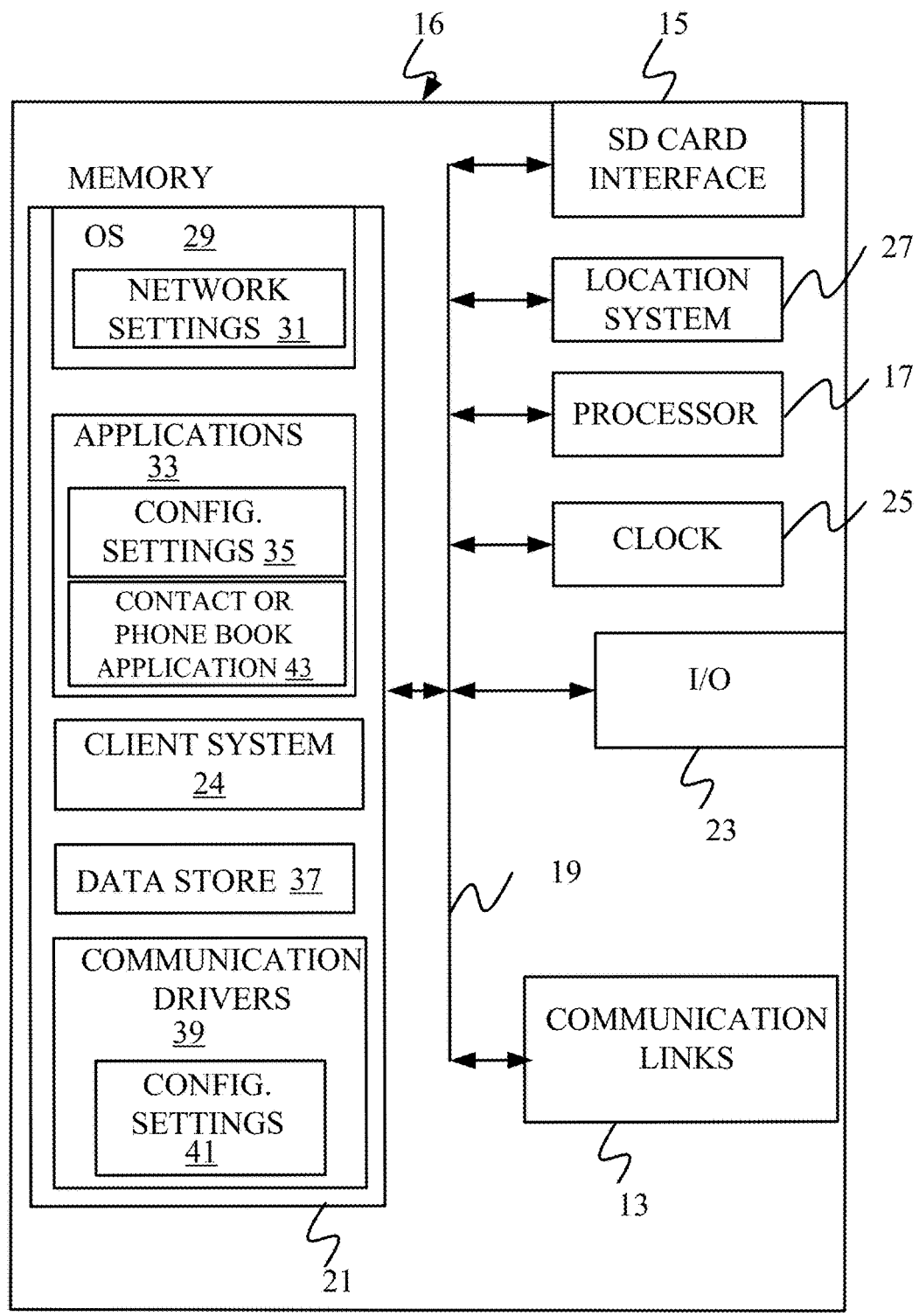
FIGS. 10-12 show examples of mobile devices that can be used in the architectures shown in the previous figures.
Figure 11:
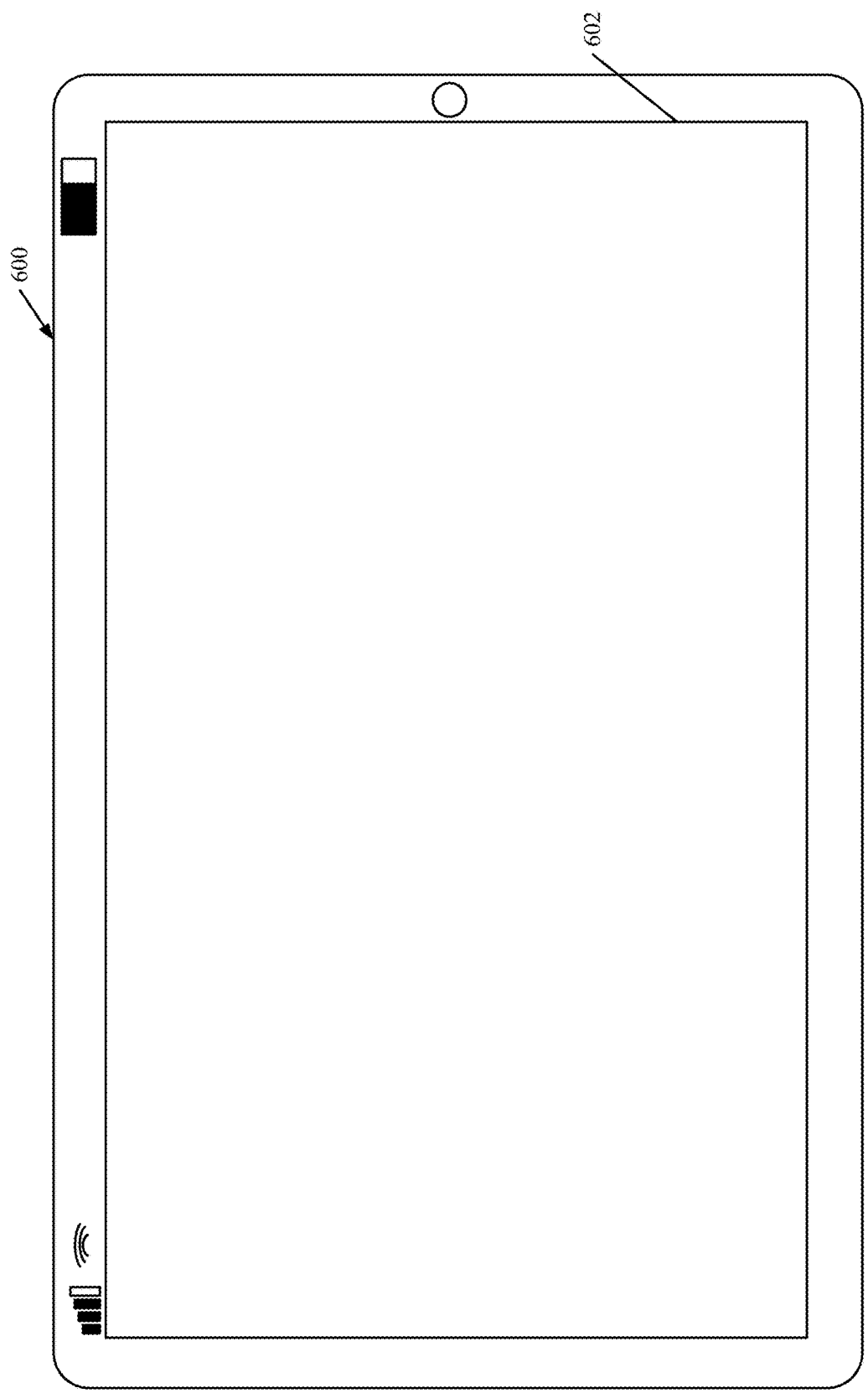
Figure 12:
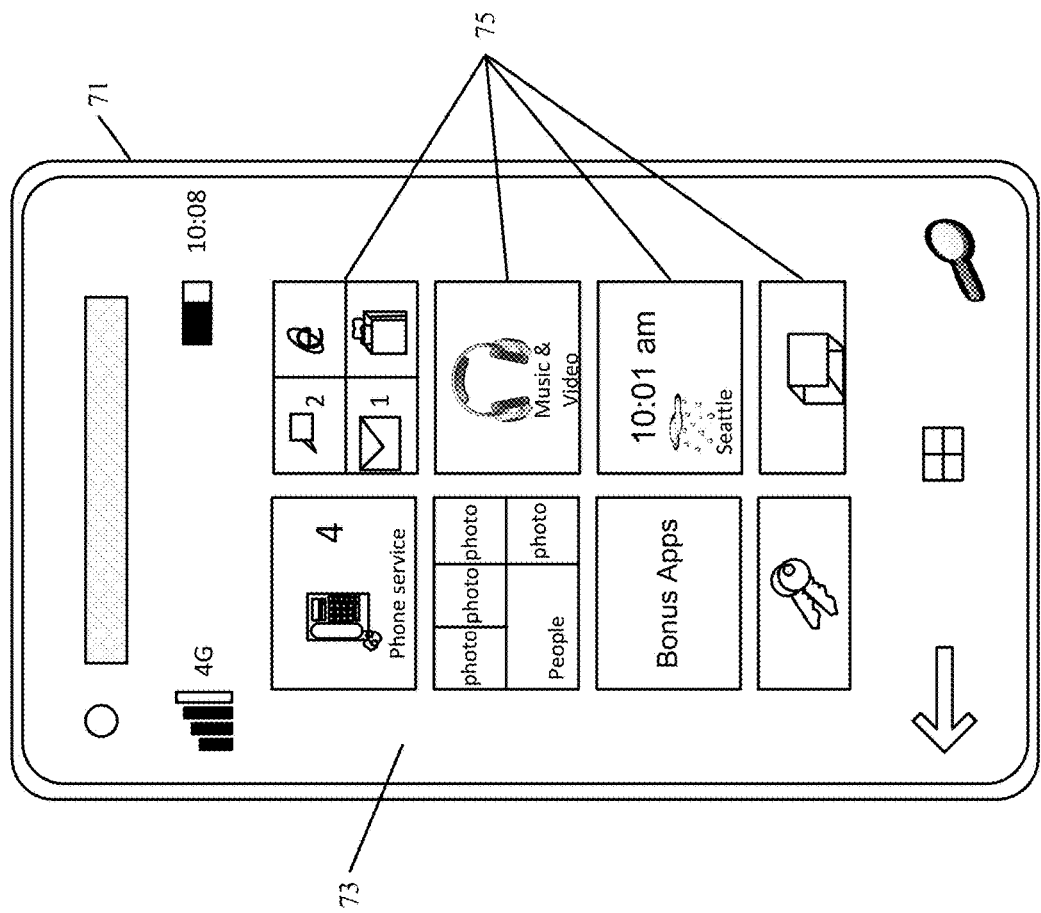

FIG. 10 is a simplified block diagram of one illustrative example of a handheld or mobile computing device that can be used as a user's or client's hand held device 16, in which the present system (or parts of it) can be deployed. FIGS. 11-12 are examples of handheld or mobile devices.

FIG. 10 provides a general block diagram of the components of a client device 16 that can run components computing system 102 or 108 or user devices 504-506 or that interacts with architecture 100, or all of the above. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 11 shows one example in which device 16 is a tablet computer 600. In FIG. 11, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 12 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 13:
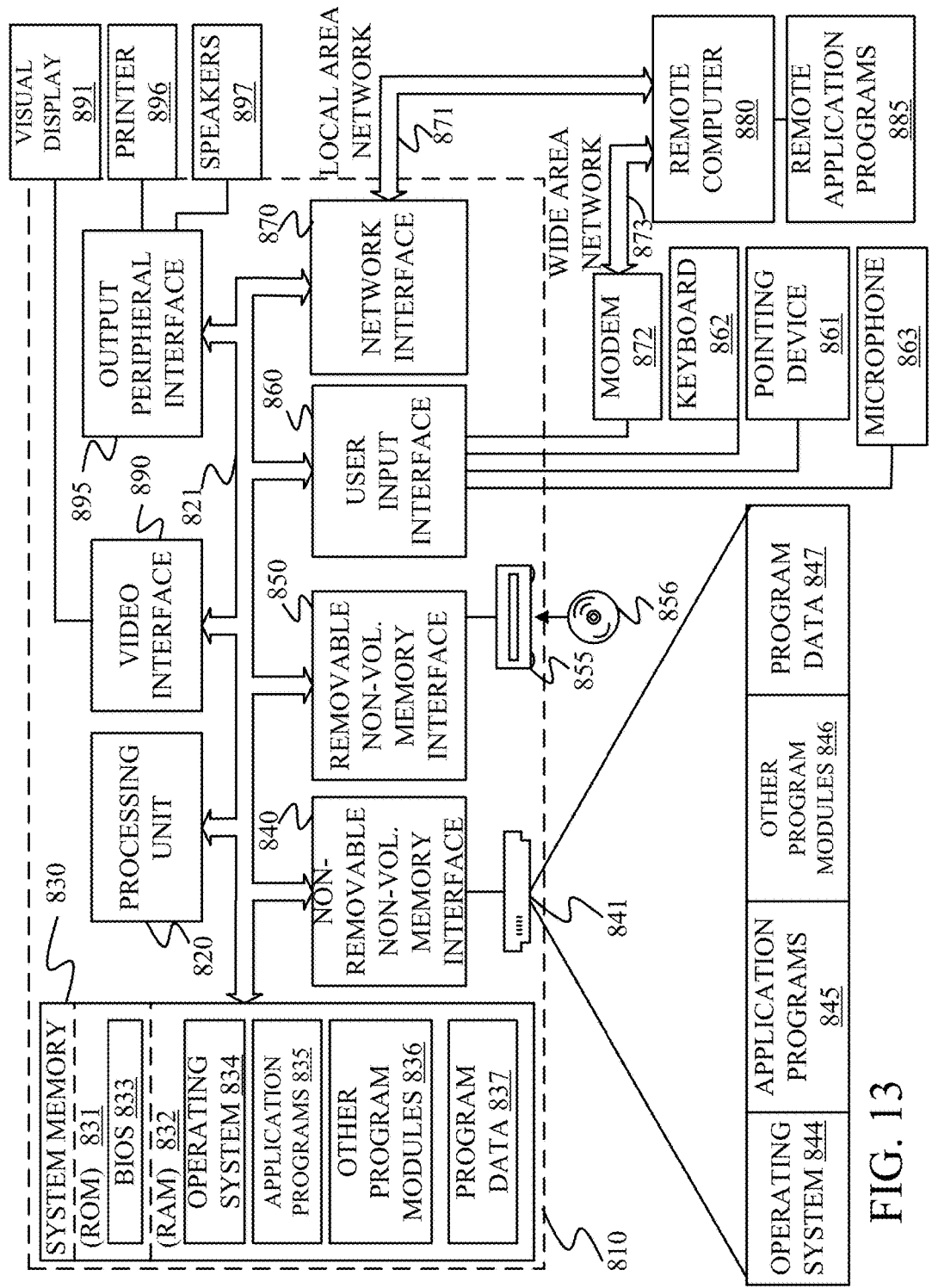
FIG. 13 is a block diagram showing one example of a computing environment that can be used in the architectures shown in the previous figures.

FIG. 13 is one example of a computing environment in which architecture 100, or parts of it, (for example) can be deployed. With reference to FIG. 13, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 13.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 13 illustrates operating system 834, application programs 835, other program modules 836, and program data 837.

The computer 810 may also include other removable/non-removable volatile/nonvolatile computer storage media. By way of example only, FIG. 13 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 13, provide storage of computer readable instructions, data structures, program modules and other data for the computer 810. In FIG. 13, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 13 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 13 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computing system, comprising:

tenant attribute collection logic configured to collect a set of tenant attributes from each of a plurality of different tenants to be on-boarded to a workload;

model selector logic configured to identify a category, of a plurality of different categories, that each of the plurality of different tenants falls into based on a categorization criterion and to select a model, that models tenant usage behavior for the workload, for each of the plurality of different tenants based on the identified category;

model application logic configured to apply the model selected for each tenant to the corresponding tenant, based on the collected attributes for the corresponding tenant, to generate an engagement value indicative of a likely engagement characteristic of the corresponding tenant relative to the workload; and a control system controlling on-boarding functionality to on-board the plurality of different tenants based on the likely engagement value generated for each of the plurality of tenants.

Example 2 is the computing system of any or all previous examples wherein the control system is configured to control an amount of computing system resources for performing on-boarding functions based on the likely engagement value generated for each of the plurality of tenants.

Example 3 is the computing system of any or all previous examples wherein the model selector logic is configured to select a set of models for each tenant, the set of models comprising:

an active potential model that is configured to generate an active metric indicative of a likely active participation level of each tenant relative to the workload.

Example 4 is the computing system of any or all previous examples wherein the set of models comprises:

a usage potential model that is configured to generate a usage metric indicative of a likely usage level of each tenant relative to the workload.

Example 5 is the computing system of any or all previous examples and further comprising:

rank metric generator logic configured to generate an active rank metric corresponding to the active metric and a usage rank metric corresponding to the usage metric.

Example 6 is the computing system of any or all previous examples and further comprising:

model score combination logic configured to combine the active rank metric and the usage rank metric to obtain the engagement value indicative of the likely engagement characteristic.

Example 7 is the computing system of any or all previous examples and further comprising:

tenant group ranking logic configured to identify a subset of the plurality of different tenants that are grouped into a group based on grouping criteria and to generate a rank ordered list of the tenants in the subset based on the engagement value for each tenant.

Example 8 is the computing system of any or all previous examples wherein the active potential model is configured to generate an active metric for each tenant, for each of a plurality of different workloads and wherein the usage potential model is configured to generate a usage metric for each tenant, for each of the plurality of different workloads.

Example 9 is the computing system of any or all previous examples wherein the rank metric generator logic comprises:

per-workload metric generator logic configured to generate an active rank metric for each tenant, for each of the plurality of different workloads, and a usage rank metric for each tenant, for each of the different workloads.

Example 10 is the computing system of any or all previous examples wherein the rank metric generator logic comprises:

per-tenant metric generator logic configured to combine all active rank metrics and usage rank metrics, for each tenant, to obtain a tenant level active rank metric and a tenant level usage rank metric for each tenant.

Example 11 is the computing system of any or all previous examples wherein the tenant ranking logic comprises:

per-tenant, workload ranking logic configured to rank the workloads in the plurality of workloads, on a per-tenant basis, based on the active rank metric and usage rank metric for each workload.

Example 12 is a computer implemented method, comprising:

controlling collection logic to collect a set of tenant attributes from each of a plurality of different tenants to be on-boarded to a workload;

comparing the tenant attributes to a categorization criterion to identify a category, of a plurality of different categories, that each of the plurality of different tenants falls into;

controlling selector logic to select a model, that models tenant usage behavior for the workload, for each of the plurality of different tenants based on the identified category;

applying the model selected for each tenant to the corresponding tenant, based on the collected attributes for the corresponding tenant, to generate an engagement value indicative of a likely engagement characteristic of the corresponding tenant relative to the workload; and controlling on-boarding functionality to on-board the plurality of different tenants based on the likely engagement value generated for each of the plurality of tenants.

Example 13 is the computer implemented method of any or all previous examples wherein controlling on-boarding functionality comprises:

controlling an amount of computing system resources for performing on-boarding functions based on the likely engagement value generated for each of the plurality of tenants.

Example 14 is the computer implemented method of any or all previous examples wherein controlling selector logic controlling the selector logic to select, for each tenant, an active potential model that is configured to generate an active metric indicative of a likely active participation level of each tenant relative to the workload, and a usage potential model that is configured to generate a usage metric indicative of a likely usage level of each tenant relative to the workload.

Example 15 is the computer implemented method of any or all previous examples and further comprising:

generating an active rank metric corresponding to the active metric and a usage rank metric corresponding to the usage metric.

Example 16 is the computer implemented method of any or all previous examples and further comprising:

controlling combination logic to combine the active rank metric and the usage rank metric to obtain the engagement value indicative of the likely engagement characteristic.

Example 17 is the computer implemented method of any or all previous examples and further comprising:

identifying a subset of the plurality of different tenants that are grouped into a group based on grouping criteria and to generate a rank ordered list of the tenants in the subset based on the engagement value for each tenant.

Example 18 is the computer implemented method of any or all previous examples wherein the active potential model is configured to generate an active metric for each tenant, for each of a plurality of different workloads and wherein the usage potential model is configured to generate a usage metric for each tenant, for each of the plurality of different workloads.

Example 19 is the computer implemented method of any or all previous examples wherein generating the active rank metric and the usage rank metric comprises:

generating an active rank metric for each tenant, for each of the plurality of different workloads, and a usage rank metric for each tenant, for each of the different workloads;

combining all active rank metrics and usage rank metrics, for each tenant, to obtain a tenant level active rank metric and a tenant level usage rank metric for each tenant; and controlling ranking logic to rank the workloads in the plurality of workloads, on a per-tenant basis, based on the active rank metric and usage rank metric for each workload.

Example 20 is a computing system, comprising:

tenant attribute collection logic configured to collect a set of tenant attributes from each of a plurality of different tenants to be on-boarded to a workload;

model selector logic configured to identify a category, of a plurality of different categories, that each of the plurality of different tenants falls into based on a categorization criterion and to select a model, that models tenant usage behavior for the workload, for each of the plurality of different tenants based on the identified category;

model application logic configured to apply the model selected for each tenant to the corresponding tenant, based on the collected attributes for the corresponding tenant, to generate an engagement value indicative of a likely engagement characteristic of the corresponding tenant relative to the workload; and a control system configured to control an amount of computing system resources for performing on-boarding functions based on the likely engagement value generated for each of the plurality of tenants.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
  at least one processor;
  memory storing instructions executable by the at least one processor, wherein the instructions, when executed, provide:
    tenant attribute collection logic configured to collect a set of tenant attributes from each of a plurality of different tenants to be on-boarded to a workload;
    model selector logic configured to:
      for each particular tenant of the plurality of tenants,
        identify a category, of a plurality of different categories, that the particular tenant falls into based on a categorization criterion; and
        select a model, that models tenant usage behavior for the workload, for the particular tenant based on the identified category;
    model application logic configured to:
      for each particular tenant of the plurality of tenants,
        apply the selected model, selected for the particular tenant, to the particular tenant, based on the collected attributes for the particular tenant;
        based on applying the selected model, generate an engagement value indicative of a likely engagement characteristic of the particular tenant relative to the workload; and
    a control system configured to control on-boarding functionality to on-board the plurality of different tenants in an on-boarding order that is based on the engagement values generated for the plurality of tenants.

2. The computing system of claim 1 wherein the control system is configured to control an amount of computing system resources for performing on-boarding functions based on the likely engagement value generated for each of the plurality of tenants.

3. The computing system of claim 1 wherein the model selector logic is configured to select a set of models for each tenant, the set of models comprising:
  an active potential model that is configured to generate an active metric indicative of a likely active participation level of each tenant relative to the workload.

4. The computing system of claim 3 wherein the set of models comprises:
  a usage potential model that is configured to generate a usage metric indicative of a likely usage level of each tenant relative to the workload.

5. The computing system of claim 4 wherein the instructions, when executed, provide:
  rank metric generator logic configured to generate an active rank metric corresponding to the active metric and a usage rank metric corresponding to the usage metric.

6. The computing system of claim 5 wherein the instructions, when executed, provide:
  model score combination logic configured to combine the active rank metric and the usage rank metric to obtain the engagement value indicative of the likely engagement characteristic.

7. The computing system of claim 6 wherein
  the instructions, when executed, provide:
    tenant group ranking logic configured to identify a subset of the plurality of different tenants that are grouped into a group based on grouping criteria and to generate a rank ordered list of the tenants in the subset based on the engagement value for each tenant, and
  the control system is configured to control the on-boarding functionality to on-board the plurality of different tenants based on the rank ordered list.

8. The computing system of claim 6 wherein the active potential model is configured to generate an active metric for each tenant, for each of a plurality of different workloads and wherein the usage potential model is configured to generate a usage metric for each tenant, for each of the plurality of different workloads.

9. The computing system of claim 8 wherein the instructions, when executed, provide:
  per-workload metric generator logic configured to generate an active rank metric for each tenant, for each of the plurality of different workloads, and a usage rank metric for each tenant, for each of the different workloads.

10. The computing system of claim 9 wherein the instructions, when executed, provide:
  per-tenant metric generator logic configured to combine all active rank metrics and usage rank metrics, for each tenant, to obtain a tenant level active rank metric and a tenant level usage rank metric for each tenant.

11. The computing system of claim 10 wherein the wherein the instructions, when executed, provide:
  per-tenant, workload ranking logic configured to rank the workloads in the plurality of workloads, on a per-tenant basis, based on the active rank metric and usage rank metric for each workload.

12. A method performed by a computing system, the method comprising:
  collecting a set of tenant attributes from each of a plurality of different tenants to be on-boarded to a workload;
  comparing the tenant attributes to a categorization criterion to identify a category, of a plurality of different categories, that each of the plurality of different tenants falls into;
  selecting a model, that models tenant usage behavior for the workload, for each of the plurality of different tenants based on the identified category;
  applying the model selected for each tenant to the corresponding tenant, based on the collected attributes for the corresponding tenant, to generate an engagement value indicative of a likely engagement characteristic of the corresponding tenant relative to the workload; and controlling on-boarding functionality to on-board the plurality of different tenants in an on-boarding order that is based on the engagement values generated for the plurality of tenants.

13. The method of claim 12 wherein controlling on-boarding functionality comprises:

controlling an amount of computing system resources for performing on-boarding functions based on the likely engagement value generated for each of the plurality of tenants.

14. The method of claim 13 wherein controlling selector logic controlling the selector logic to select, for each tenant, an active potential model that is configured to generate an active metric indicative of a likely active participation level of each tenant relative to the workload, and a usage potential model that is configured to generate a usage metric indicative of a likely usage level of each tenant relative to the workload.

15. The method of claim 14 and further comprising:

generating an active rank metric corresponding to the active metric and a usage rank metric corresponding to the usage metric.

16. The method of claim 15 and further comprising:

controlling combination logic to combine the active rank metric and the usage rank metric to obtain the engagement value indicative of the likely engagement characteristic.

17. The method of claim 16 and further comprising:

identifying a subset of the plurality of different tenants that are grouped into a group based on grouping criteria and to generate a rank ordered list of the tenants in the subset based on the engagement value for each tenant.

18. The method of claim 16 wherein the active potential model is configured to generate an active metric for each tenant, for each of a plurality of different workloads and wherein the usage potential model is configured to generate a usage metric for each tenant, for each of the plurality of different workloads.

19. The method of claim 18 wherein generating the active rank metric and the usage rank metric comprises:

generating an active rank metric for each tenant, for each of the plurality of different workloads, and a usage rank metric for each tenant, for each of the different workloads;

combining all active rank metrics and usage rank metrics, for each tenant, to obtain a tenant level active rank metric and a tenant level usage rank metric for each tenant; and controlling ranking logic to rank the workloads in the plurality of workloads, on a per-tenant basis, based on the active rank metric and usage rank metric for each workload.

20. A computing system, comprising:

at least one processor;

memory storing instructions executable by the at least one processor, wherein the instructions, when executed, cause the computing system to:

collect a set of tenant attributes from each of a plurality of different tenants to be on-boarded to a workload;

for each particular tenant of the plurality of tenants, identify a category, of a plurality of different categories, that the particular tenant falls into based on a categorization criterion; and select a model, that models tenant usage behavior for the workload, for the particular tenant based on the identified category;

for each particular tenant of the plurality of tenants, apply the selected model, selected for the particular tenant, to the particular tenant, based on the collected attributes for the particular tenant; and based on applying the selected model, generate an engagement value indicative of a likely engagement characteristic of the particular tenant relative to the workload; and control an amount of computing system resources for performing on-boarding functions based on the engagement values generated for the plurality of tenants.

* * * * *